(12) United States Patent
Larsen et al.

(10) Patent No.: US 11,846,338 B2
(45) Date of Patent: Dec. 19, 2023

(54) DAMPING ARRANGEMENT FOR ROTATING SHAFT

(71) Applicant: Component 2.0 A/S, Hørsholm (DK)

(72) Inventors: Asger Meng Larsen, Farum (DK); Janus Juul Rasmussen, Helsinge (DK)

(73) Assignee: Component 2.0 A/S, Hørsholm (DK)

( * ) Notice: Subject to any disclaimer, the term of this patent is extended or adjusted under 35 U.S.C. 154(b) by 0 days.

(21) Appl. No.: 17/927,254

(22) PCT Filed: May 26, 2021

(86) PCT No.: PCT/DK2021/050161
§ 371 (c)(1),
(2) Date: Nov. 22, 2022

(87) PCT Pub. No.: WO2021/249600
PCT Pub. Date: Dec. 16, 2021

(65) Prior Publication Data
US 2023/0193976 A1    Jun. 22, 2023

(30) Foreign Application Priority Data

Jun. 8, 2020 (DK) ............................. PA202070359

(51) Int. Cl.
*F16F 15/12* (2006.01)
(52) U.S. Cl.
CPC ...... *F16F 15/1207* (2013.01); *F16F 15/1201* (2013.01); *F16F 2232/04* (2013.01); *F16F 2232/08* (2013.01)
(58) Field of Classification Search
CPC ............... F16F 15/1207; F16F 15/1201; F16F 2232/04; F16F 2232/08
(Continued)

(56) References Cited

U.S. PATENT DOCUMENTS

| 2,967,739 A | 1/1961 | Hoffman |
| 3,015,523 A | 1/1962 | Semar |

(Continued)

FOREIGN PATENT DOCUMENTS

| EP | 0134856 | 3/1985 |
| JP | S50146779 | 11/1975 |

(Continued)

OTHER PUBLICATIONS

International Search Report and Written Opinion dated Jul. 1, 2021 from IA PCT/DK2021/050161.
Notice of Reasons for Refusal dated Apr. 18, 2023 from Japanese Patent Application 2022-574247.

*Primary Examiner* — Greg Binda
(74) *Attorney, Agent, or Firm* — Crockett & Crockett, PC; K. David Crockett, Esq.

(57) ABSTRACT

A damping arrangement (1) for damping radial vibrations in a rotating shaft (2), the damping arrangement (1) comprising at least one first damping element (3), at least one second damping element (4), and a bearing arrangement (5) operably engaging the first damping element (3) and the second damping element (4). The bearing arrangement (5) comprises a first bearing member (6), a second bearing member (7), and a reference (8). The first bearing member (6) is rotatably mounted on the shaft (2) so that radial movement of the shaft (2) is transferred to the first bearing member (6), and is operably connected to the second bearing member (7) by the first damping element (3) and by a first steering structure (9). The first steering structure (9) allows only reciprocating movement of the first bearing member (6), and the shaft (2), in a first radial direction (D1), and the first damping element (3) dampens the reciprocating movement in the first radial direction (D1) with respect to the second bearing member (7). The second bearing member (7) is operably connected to the reference (8) by the second (Continued)

damping element (4) and by a second steering structure (10) allowing only reciprocating movement of the second bearing member (7), the first bearing member (6), and the shaft (2), in a second radial direction D2. The second damping element (4) dampens the reciprocating movement in the second radial direction (D2) with respect to the reference (8).

13 Claims, 5 Drawing Sheets

(58) Field of Classification Search
USPC ........ 267/140.5; 180/381; 248/638; 464/180
See application file for complete search history.

(56) References Cited

U.S. PATENT DOCUMENTS

| | | | |
|---|---|---|---|
| 7,806,774 B2 * | 10/2010 | Manfredotti | F16F 15/03 |
| | | | 464/180 |
| 2003/0202726 A1 | 10/2003 | Robb et al. | |
| 2008/0116316 A1 | 5/2008 | Manfredotti et al. | |
| 2011/0148113 A1 | 6/2011 | Li et al. | |

FOREIGN PATENT DOCUMENTS

| | | |
|---|---|---|
| WO | WO2005026574 | 3/2005 |
| WO | WO2019092928 | 5/2019 |

* cited by examiner

DAMPING ARRANGEMENT FOR ROTATING SHAFT

TECHNICAL FIELD

The disclosure relates to a rotating shaft arrangement and, more particularly, to a damping arrangement for damping radial vibrations in the rotating shaft of a rotating shaft arrangement.

BACKGROUND

Mechanical systems having rotating components, such as rotating shafts, often experience oscillation related problems due to, e.g., mechanical unbalance or misalignment between components, coupled with the eigenfrequencies of the shaft.

Eigenfrequencies are the frequencies at which a system tends to oscillate and are generally undesirable during operation of the system.

All rotating shafts will, to some extent, have an unbalanced mass creating resonant vibration when the shaft's rotational speed is close, or equal to, its eigenfrequencies, which is also known as the critical speed. The magnitude of shaft deflection depends upon factors such as the stiffness of the shaft and its support, the distance between supports, the distributed mass of the shaft and attached components, any unbalance of the mass with respect to the axis of rotation, the shape of the shaft, and the amount of damping in the system.

In general, it is necessary to calculate the critical speed of the rotating shaft, as the critical speed is the speed of rotation which excites resonant vibrations, i.e. the eigenfrequencies, of the shaft. As the speed of rotation of the shaft approaches the shaft's eigenfrequency, the shaft begins to resonate, leading to a dramatic increase in system vibration and, possibly, noise.

Furthermore, such shaft vibration imposes additional load on other components such as bearings, couplings, gears etc., which might eventually lead to catastrophic failure of the mechanical system.

One solution to avoid exciting the eigenfrequencies of the shaft is simply to design the system such that the maximum speed is lower than the lowest critical speed, or in an interval between critical speeds. However, this greatly limits the usefulness of the mechanical system.

The problem of eigenfrequency excitation can, instead, be mitigated by adding several bearings, or bearing arrangements, along the rotating shaft in order to dampen any radial vibrations. However, this creates a different set of problems, as the bearings need to be aligned very precisely, which is a very expensive and time-consuming process. Additionally, bearing alignment may deteriorate over the years due to use. Furthermore, when overconstraining the shaft by increasing the number of bearings, there is an increased risk of misalignment between bearings, and tolerance stack-up.

SUMMARY

It is an object to provide a damping arrangement for damping radial vibrations that overcomes, or at least reduces, the problem mentioned above. The foregoing and other objects are achieved by the features of the independent claims. Further implementation forms are apparent from the dependent claims, the description, and the figures.

According to a first aspect, there is provided a damping arrangement for damping radial vibrations in a rotating shaft. The damping arrangement comprises at least one first damping element, at least one second damping element, and a bearing arrangement operably engaging the first damping element and the second damping element. The bearing arrangement comprises a first bearing member, a second bearing member, and a reference, at least partially arranged in a nesting configuration. The first bearing member is rotatably mounted on the shaft so that radial movement of the shaft is transferred to the first bearing member. The first bearing member is operably connected to the second bearing member by the first damping element and by a first steering structure, the first steering structure allowing only reciprocating movement of the first bearing member, and the shaft, in a first radial direction, with the first damping element dampening the reciprocating movement in the first radial direction with respect to the second bearing member. The second bearing member is operably connected to the reference by the second damping element and by a second steering structure, the second steering structure allowing only reciprocating movement of the second bearing member, the first bearing member, and the shaft, in a second radial direction, and the second damping element dampening the reciprocating movement in the second radial direction with respect to the reference.

This damping arrangement allows radial vibrations of the shaft to be dampened, and hence system vibration and noise to be avoided, by providing a bearing arrangement having built in radial dampening. This allows a rotating shaft to be supported by the damping arrangement according to the first aspect and combined with significantly fewer bearings than prior art solutions, which require a plurality of bearings arranged along the entire length of the shaft. By using only a damping arrangement according to the first aspect, there is no longer a need for precisely aligning a large number of bearings, making the damping arrangement not only less expensive but also more reliable than prior art solutions, since alignment preciseness during assembly, and use, is no longer an issue.

In a possible implementation of the first aspect, the first bearing member is rotatably mounted on the shaft to allow the first bearing member the shaft to rotate relative to the first bearing member, a rotation axis of the shaft preferably corresponding to a center axis of the shaft. This prevents any misalignment between the first bearing member and the shaft arising due to said rotation.

In a further possible implementation form of the first aspect, the first bearing member and the second bearing member are configured to self-align, with respect to each other in the first radial direction and in the second radial direction, in response to the radial vibrations, preventing any permanent misalignment between the first bearing member and the second bearing member, and subsequently the second bearing member and the shaft.

In a further possible implementation form of the first aspect, the first bearing member and the second bearing member form a sliding bearing.

In a further possible implementation form of the first aspect, the second direction is angularly spaced from the first direction, preferably by an angle of at least 45° and most preferably by an angle of approximately 90°, such a distribution preventing the shaft from bending in the first direction.

In a further possible implementation form of the first aspect, the second direction extends perpendicular to the first direction and to a center axis of the shaft.

In a further possible implementation form of the first aspect, the first bearing member and the second bearing member share center axes with the shaft.

In a further possible implementation form of the first aspect, radial vibrations of the shaft generate reciprocating movement of the first bearing member in the first direction and/or the second direction, and/or reciprocating movement of the second bearing member in the second direction, facilitating response to radial vibrations in several, preferably all, radial directions.

In a further possible implementation form of the first aspect, the first bearing member is movably arranged along the first direction and the second direction, and the second bearing member is fixedly arranged along the first direction.

In a further possible implementation form of the first aspect, the first damping element is at least partially located between the first bearing member and the second bearing member to dampen reciprocating movement of the first bearing member in the first direction, and the second damping element is at least partially located between the second bearing member and the reference to dampen reciprocating movement of the second bearing member in the second direction. This locks the rotation of the first bearing member to the reference, and uses the relative motion between the first bearing member and the second bearing member, and between the second bearing member and the reference to dampen oscillations by the means of damping elements.

In a further possible implementation form of the first aspect, at least radial vibrations having a first eigenfrequency, and optionally a second eigenfrequency, are dampened by the damping arrangement, such that system vibration and noise is kept to a minimum.

In a further possible implementation form of the first aspect, the first damping element and the second damping element are one of a single-acting and a double-acting damping element, allowing the damper arrangement to be configured in response to the space available and manufacturing cost restrictions.

In a further possible implementation form of the first aspect, the damping arrangement comprises two first damping elements arranged along the first direction, on diametrically opposite sides of the center axis, allowing the dampening to be executed in two opposite directions by means of simple and reliable damping elements.

In a further possible implementation form of the first aspect, the damping arrangement comprises two second damping elements arranged along the second direction, on diametrically opposite sides of the center axis, allowing the dampening to be executed in two further, opposite directions by means of simple and reliable damping elements.

In a further possible implementation form of the first aspect, the first bearing member, the second bearing member, and the reference are substantially prismatic in shape.

In a further possible implementation form of the first aspect, the first damping element and the second damping element comprise fluid, allowing the dampening to be executed in opposite directions by means of very simple and easily replaceable damping elements.

In a further possible implementation form of the first aspect, the first bearing member and the second bearing member comprise peripherally extending recesses configured to accommodate the fluid, the peripherally extending recesses extending in outer circumferential surfaces of the first bearing member and the second bearing member. The cavities formed by the recessed surfaces of the first bearing member and the second bearing member contain the fluid and allows the fluid to provide sufficient load-carrying capacity in the radial direction.

In a further possible implementation form of the first aspect, the reciprocating movement of the first bearing member in the first direction has a maximum amplitude of ±25% of a shaft diameter from the center axis, and/or the reciprocating movement of the second bearing member in the second direction has a maximum amplitude of ±25% of a shaft diameter from the center axis, allowing dampening of radial vibrations in a majority of mechanical systems requiring such dampening, without inducing too much stress on the damping arrangement or shaft.

In a further possible implementation form of the first aspect, the first steering structure and/or the second steering structure comprise at least two slidingly engaging steering elements, the steering elements preferably being one groove and one protrusion. This is a cost effective and highly reliable solution which limits any movement to two opposite directions along one axis.

In a further possible implementation form of the first aspect, the second bearing member comprises a plurality of grooves, at least one first groove being part of the first steering structure, and at least one second groove being part of the second steering structure, the first bearing member comprises at least one first protrusion engaging the first groove, and the reference comprises at least one second protrusion engaging the second groove, allowing a simple and reliable interconnection between the parts of the bearing arrangement, which still allows radial movement.

In a further possible implementation form of the first aspect, the reference comprises at least one axial stop configured to prevent the first bearing member and the second bearing member from moving axially along the shaft, with respect to the reference, such that the dampening arrangement is maintained at its initial location along the shaft and, hence, the dampening effect on the shaft also maintained.

According to a second aspect, there is provided a rotating shaft arrangement comprising a shaft, a first bearing, a second bearing, and the damping arrangement according to the above, the shaft, the first bearing, the second bearing, and the damping arrangement sharing a center axis, the first bearing and the second bearing being separated by a distance along the center axis, the damping arrangement being arranged between the first bearing and the second bearing at a location, along the center axis, where the radial vibrations of the shaft have a maximum amplitude.

This type of shaft arrangement allows radial vibrations of the shaft to be dampened, and hence system vibration and noise to be avoided, by means of only one damping arrangement arranged at the location of the shaft which is the most affected by radial vibrations. Furthermore, the arrangement is kinematically determined in that there is no generation of parasitic loads regardless of issues such as tolerances, misalignment etc. within the arrangement. The damping arrangement is a floating damper arrangement resisting only radial velocity, and can thus be considered a pure damper.

In a possible implementation form of the second aspect, the radial vibrations have a sinusoidal waveform, a maximum amplitude of the sinusoidal waveform corresponding to the maximum amplitude of the radial vibrations.

In a further possible implementation form of the second aspect, when the radial vibrations of the shaft are equal to a first eigenfrequency, the maximum amplitude arises equidistantly between the first bearing and the second bearing along the center axis, and, preferably, the damping arrangement is arranged equidistantly between the first bearing and the second bearing in order to dampen the radial vibrations at the point of maximum amplitude.

In a further possible implementation form of the second aspect, when the radial vibrations of the shaft are equal to a second eigenfrequency, the maximum amplitudes arise at ¼*distance from the first bearing and ¼*distance from the second bearing, and, preferably, the damping arrangements are offset along the shaft such that they are arranged at ¼*distance from the first bearing and ¼*distance from the second bearing, in order to dampen the radial vibrations at all points of maximum amplitude.

In a further possible implementation form of the second aspect, when the radial vibrations of the shaft are equal to a third eigenfrequency, the maximum amplitudes arise equidistantly between the first bearing and the second bearing along the center axis, at ¼*distance from the first bearing, and at ¼*distance from the second bearing, and, preferably, the damping arrangements are arranged equidistantly between the first bearing and the second bearing, at ¼*distance from the first bearing, and at ¼*distance from the second bearing, in order to dampen the radial vibrations at all points of maximum amplitude.

In a further possible implementation form of the second aspect, the first bearing and/or the second bearing is a ball bearing, such as a spherical ball bearing, a journal bearing, or a magnetic bearing.

These and other aspects will be apparent from and the embodiment(s) described below.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

Figure 1:
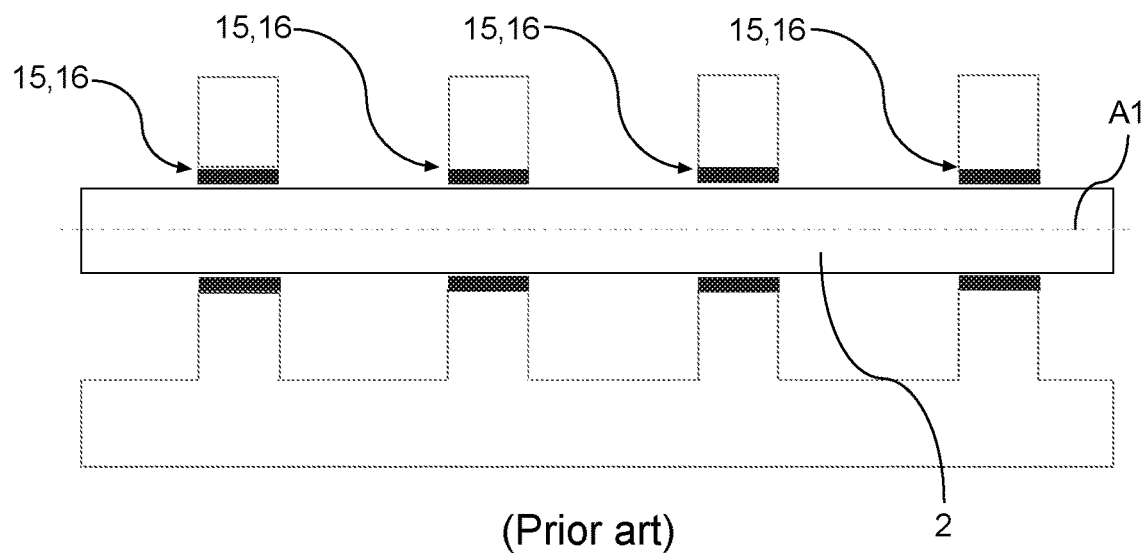
FIG. 1 is a schematic illustration of a rotating shaft arrangement according to prior art.

FIG. 1 shows a conventional rotating shaft arrangement comprising a shaft 2 and a plurality of bearings 15, 16 arranged along the center axis A1 of the shaft 2. Such a rotating shaft arrangement may be part of machine systems such as turbine generators and internal combustion engines, and may be used as drive shafts in road vehicles, as propulsion shafts in ships, as fan shafts, or as crankshafts, to name a few. Such rotating shafts 2 are subject to radial vibrations, e.g. due to mechanical unbalance or misalignment between components, resonating with the eigenfrequencies of the shaft, which vibrations are often mitigated using a plurality of bearings 15, 16 placed along the shaft 2, as shown in FIG. 1.

Figure 2:
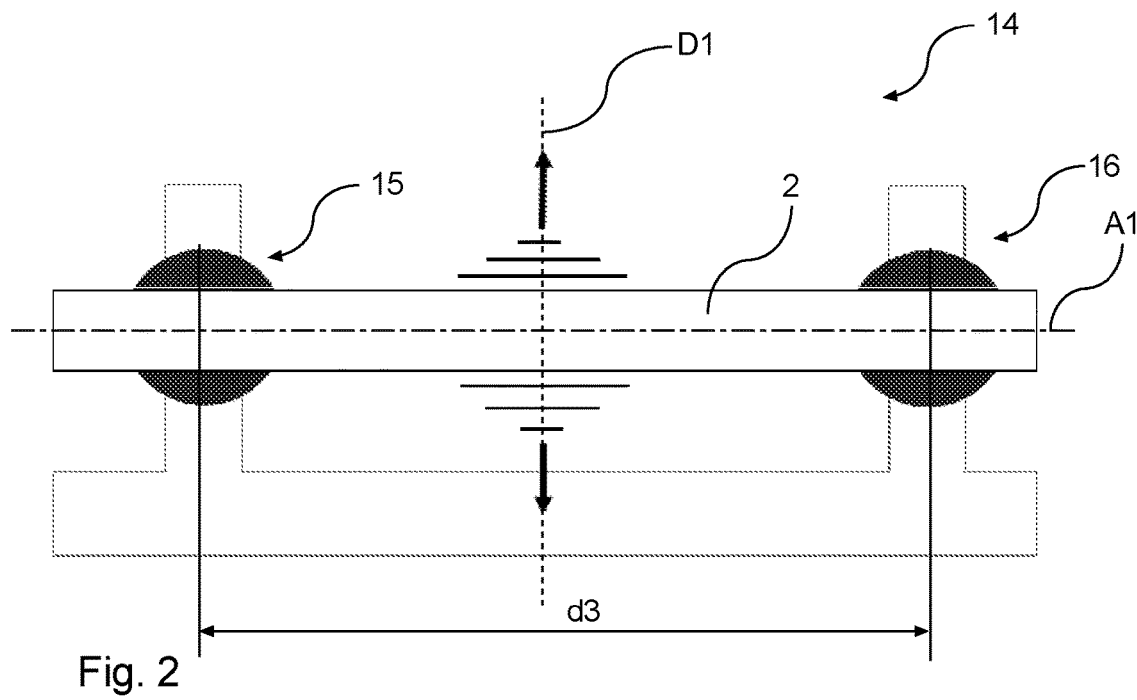
FIG. 2 is a schematic illustration of a rotating shaft arrangement in accordance with an embodiment.

The embodiment shown schematically in FIG. 2 relates to a rotating shaft arrangement 14 comprising a shaft 2, a first bearing 15, a second bearing 16, and a damping arrangement 1 which is described in detail further below. The shaft 2 is preferably a prismatic shaft made of an isotropic material, prismatic meaning the cross-section of the shaft being constant throughout its length.

The first bearing 15 and the second bearing 16 carry the shaft 2, and are separated by a distance d3 along the center axis A1. Preferably, the first bearing 15 and the second bearing 16 are located at, or adjacent, opposite ends of shaft 2. The rotating shaft arrangement 14 may comprise more than one damping arrangement 1, however, the paragraphs below describe a rotating shaft arrangement 14 comprising only one damping arrangement 1 for the sake of clarity. The rotating shaft arrangement 14 may also comprise more than two bearings 15, 16.

The shaft 2, the first bearing 15, the second bearing 16, and the damping arrangement 1 all share a center axis A1, i.e. the first bearing 15, the second bearing 16, and the damping arrangement 1 are arranged in at least partial alignment around the shaft 2.

The damping arrangement 1 is preferably arranged between the first bearing 15 and the second bearing 16, along the center axis A1, at a location where the radial vibrations of the shaft 2, have a maximum amplitude, hence giving a maximum damping effect. The radial vibrations may have a sinusoidal waveform, such that the maximum amplitude of the sinusoidal waveform corresponds to the maximum amplitude of the radial vibrations both in size and location.

All eigenfrequencies arising in the rotating shaft arrangement 14, may be dampened by one or several damping arrangements 1.

Figure 3:
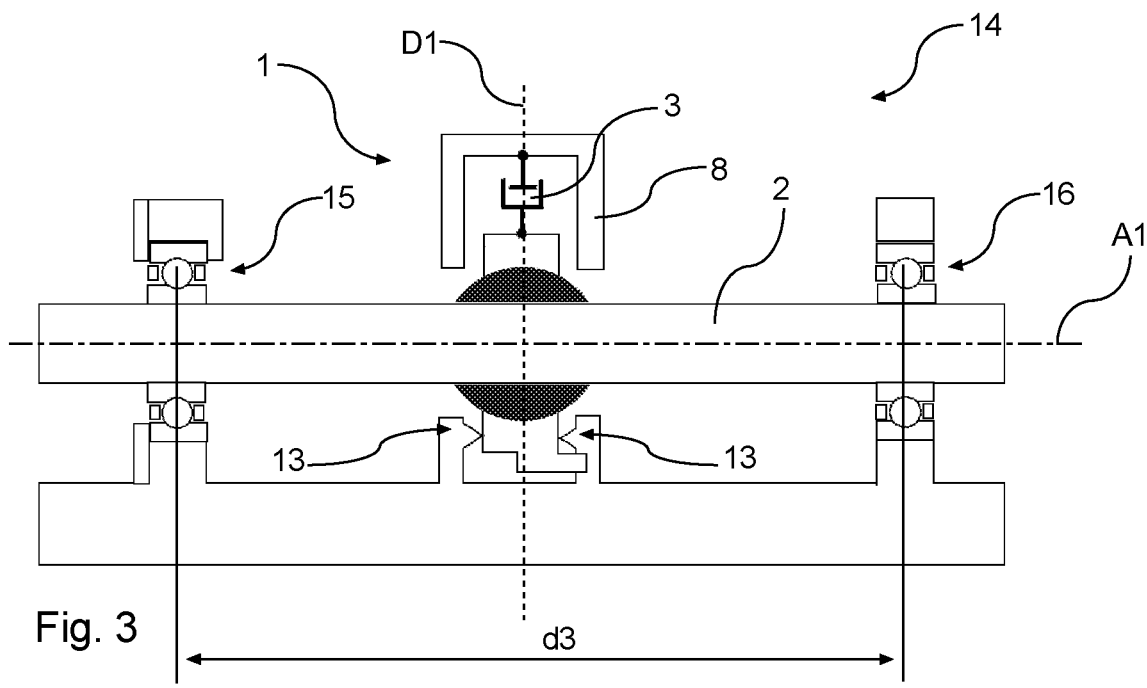
FIG. 3 shows a longitudinal cross-section of a rotating shaft arrangement in accordance with an embodiment.
Figure 4:
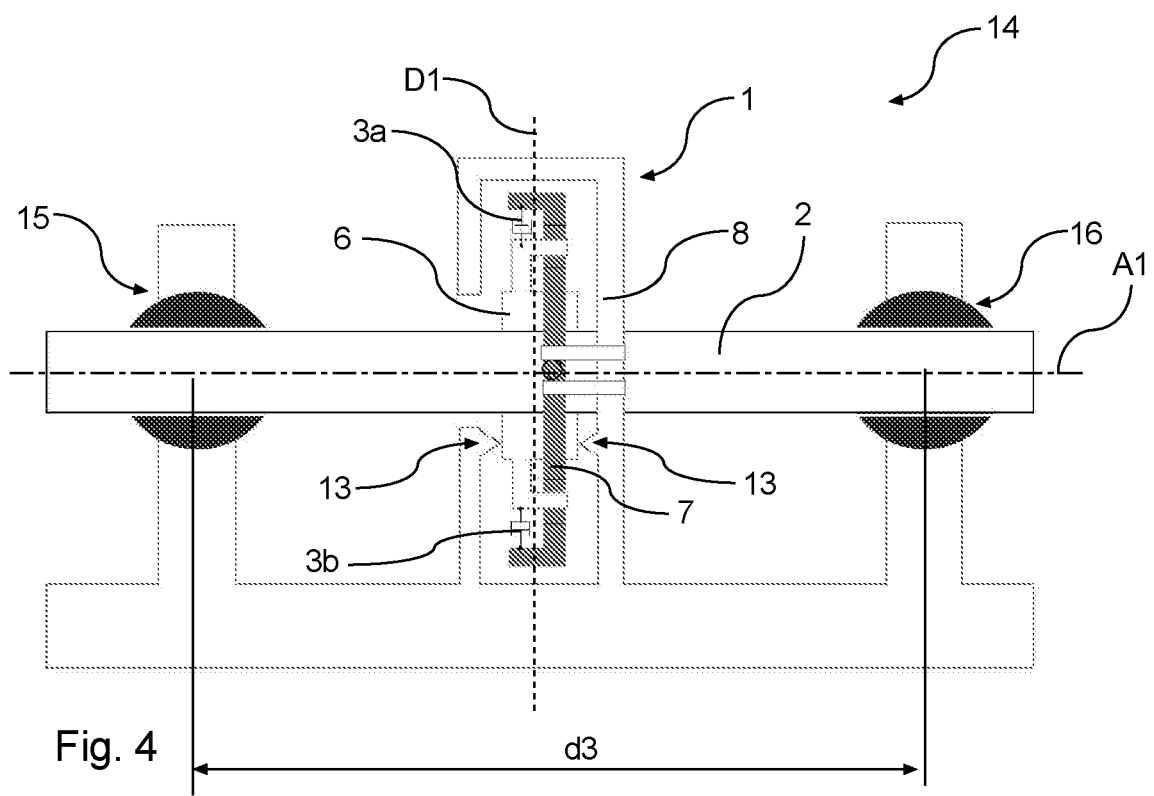
FIG. 4 shows a longitudinal cross-section of a rotating shaft arrangement in accordance with a further embodiment.

When the radial vibrations of the shaft 2 are equal to the first eigenfrequency of the shaft 2, the maximum amplitude of the vibrations arises equidistantly between the first bearing 15 and the second bearing 16 along the center axis A1, preferably at the center point of the shaft 2. In such an embodiment, the damping arrangement 1 is also arranged equidistantly between the first bearing 15 and the second bearing 16, as shown in FIGS. 3 and 4.

When, instead, the radial vibrations of the shaft 2 are equal to the second eigenfrequency of the shaft 2, the maximum amplitudes arise at ¼*distance d3 from the first bearing 15 and ¼*distance d3 from the second bearing 16, i.e. the maximum amplitudes are offset along the shaft 2 such that they arise between the center point of the shaft 2 and the first bearing 15 and between the center point of the shaft 2 and the second bearing 16. The distance between the first bearing 15 and the maximum amplitude location is ¼ of the total distance d3 between the first bearing 15 and the second bearing 16, and the distance between the second bearing 16 and the maximum amplitude location is also ¼ of the total distance d3. In such an embodiment, the damping arrangements 1 are placed such that they too are offset along the shaft 2, locating them at a quarter of distance d3, ¼*d3, from the first bearing 15 along the center axis A1 and at a quarter of the distance d3, ¼*d3, from the second bearing 16 along the center axis A1 (not shown).

If the radial vibrations of the shaft 2 are equal to the third eigenfrequency of the shaft 2, the maximum amplitudes arise at ⅓*distance d3 from the first bearing 15, at ⅔*distance d3 from the first bearing 15, and at ⅓*distance d3 from the second bearing 16, i.e. the maximum amplitudes are arranged along the shaft 2 such that they arise at the center point of the shaft 2, between the center point of the shaft 2 and the first bearing 15, as well as between the center point of the shaft 2 and the second bearing 16 (not shown).

The first bearing 15 and/or the second bearing 16 may be a ball bearing, such as a spherical ball bearing, a journal bearing, a magnetic bearing, or any other type of suitable bearing.

One embodiment of the damping arrangement 1, used for damping radial vibrations in the rotating shaft 2, is shown schematically in FIGS. 3 and 4, where the damping arrangement 1 is shown in combination with the above-mentioned shaft 2, first bearing 15, and second bearing 16. FIGS. 5 to 9 show further embodiments of the damping arrangement 1 as arranged on the shaft 2.

The damping arrangement 1 comprises at least one first damping element 3, at least one second damping element 4, and a bearing arrangement 5 which operably engages the first damping element 3 and the second damping element 4. As indicated in FIG. 5, the damping arrangement 1 may comprise two oppositely arranged first damping elements 3a, 3b and two oppositely arranged second damping elements 4a, 4b.

The first damping element 3, 3a, 3b and the second damping element 4, 4a, 4b may be any kind of suitable linear damper. The first damping element 3, 3a, 3b and the second damping element 4, 4a, 4b may be a single-acting or a double-acting damping element.

In one embodiment (not shown), the damping arrangement 1 comprises one double-acting damping element dampening reciprocating movement along a first radial direction D1, and one double-acting damping element dampening reciprocating movement along a second radial direction D2.

Figure 5:
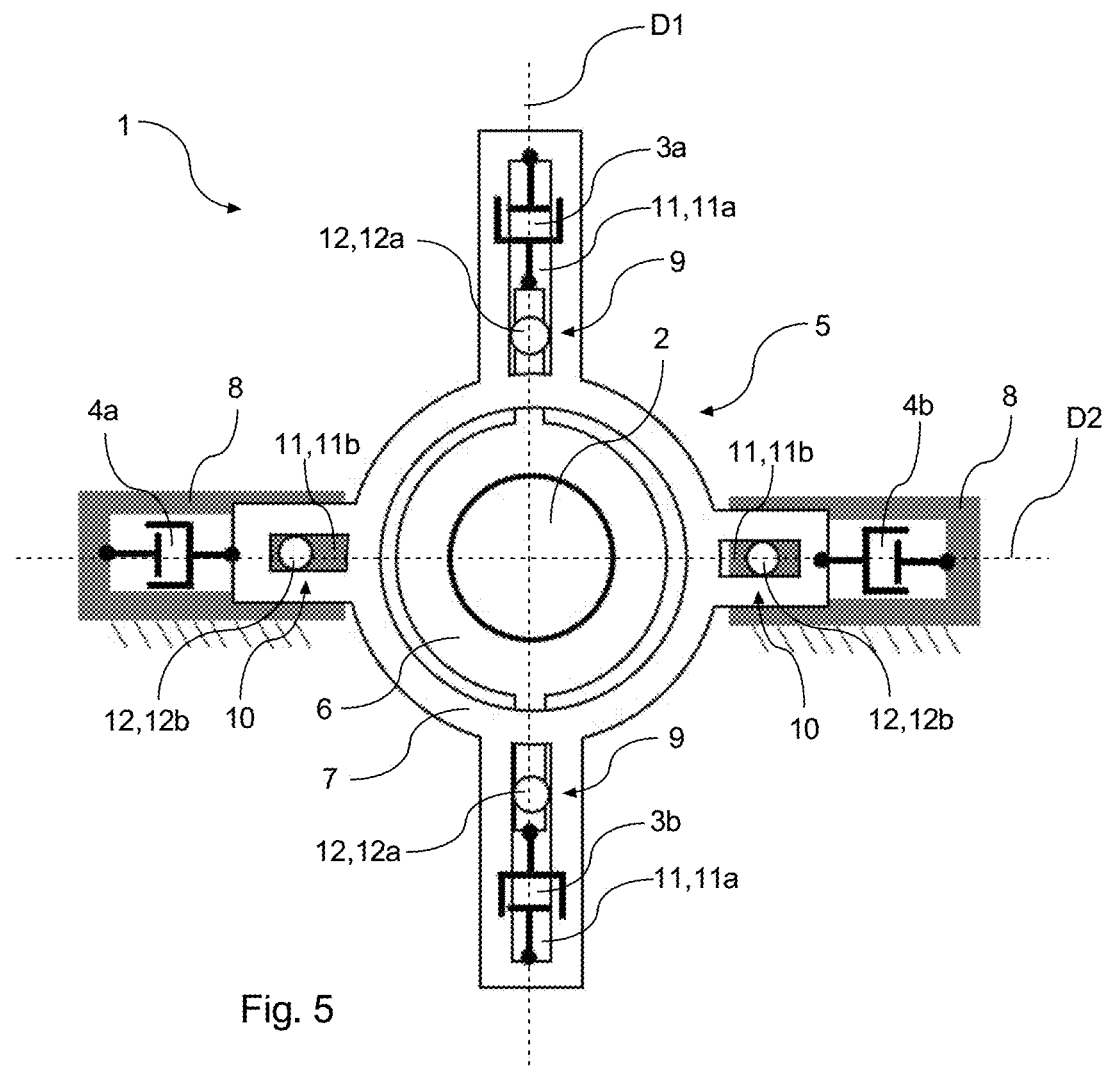
FIG. 5 shows a transverse cross-section of a rotating shaft arrangement in accordance with an embodiment n.

FIG. 5 shows an embodiment comprising two first damping elements 3a, 3b acting along radial direction D1, and two oppositely arranged second damping elements 4a, 4b acting along radial direction D2. "Direction" in this case equates to "axis", i.e. movement along the radial direction D1 includes movement directed towards a first orientation and movement directed towards a second orientation along a first axis, the second orientation being directly opposite to the first orientation.

In other words, the first radial direction D1 refers to two opposite directions extending along one and the same first axis. Correspondingly, the second radial direction D2 refers to two opposite directions extending along one and the same second axis. The first and second axes are not parallel, but extend at an angle >0° to each other.

In one embodiment, the second direction D2 is angularly spaced from the first direction D1 by an angle of at least 45° and, most preferably, an angle of approximately 90°. The second direction D2 may, in other words, extend perpendicular to the first direction D1 and to a center axis A1 of the shaft 2, as shown in FIG. 5.

As shown in detail in FIGS. 5 to 8, the damping arrangement 1 may comprise two first damping elements 3a, 3b arranged along the first direction D1, on diametrically opposite sides of the center axis A1. Additionally, the damping arrangement 1 may comprise two second damping elements 4a, 4b arranged along the second direction D2, on diametrically opposite sides of the center axis A1. The first damping elements 3a, 3b and the second damping elements 4a, 4b may be either single-acting or double-acting damping elements.

As mentioned above, the first damping element(s) 3, 3a, 3b and the second damping element(s) 4, 4a, 4b may be linear dampers. However, the first damping element 3 and the second damping element 4 may instead comprise a body of fluid each, such as oil or water.

The bearing arrangement 5 comprises, as shown in FIGS. 4 and 5, a first bearing member 6, a second bearing member 7, and a reference 8. The reference 8 may also be referred to as a frame or a housing, and the reference 8 is arranged such that it is completely stationary with regards to the shaft, the first bearing member 6, and the second bearing member 7.

The first bearing member 6, the second bearing member 7, and the reference 8 are at least partially arranged in a nesting configuration, shown in particular in FIGS. 4 and 5, such that the first bearing member 6 is at least partially enclosed by the second bearing member 7, and the second bearing member 7, in turn, is at least partially enclosed by the reference 8, i.e. the second bearing member 7 being arranged between the first bearing member 6 and the reference 8. By arranging the active components of the bearing arrangement 5, i.e. the first bearing 6 and the second bearing 7, within its passive component, i.e. reference 8, the movement and function of these active components is not affected by other components than the shaft 2.

The first bearing member 6, which also may be referred to as a bearing, is mounted on the shaft 2 so that radial movement of the shaft 2 is transferred to the first bearing member 6. Preferably, the first bearing member 6 is rotatably mounted on the shaft 2 to allow the shaft 2 to rotate relative to the first bearing member 6. The rotation axis of the shaft 2 corresponds to the center axis A1 of the shaft 2.

The second bearing member 7, which also may be referred to as a ring, is operably connected to the first bearing member 6, as described in more detail further below. The first bearing member 6 and the second bearing member 7 may share center axes with the shaft 2, as indicated in e.g. FIG. 8. The first bearing member 6 and the second bearing member 7 may together form a sliding bearing.

Preferably, the first bearing member 6 and the second bearing member 7 are configured to self-align with respect to each other, in the first radial direction D1 and in the second radial direction D2, in response to radial vibrations.

The reference 8 may comprise at least one axial stop 13, for example two axial stops 13 as shown in FIGS. 3 and 4, which axial stop(s) 13 is/are configured to prevent the first bearing member 6 and the second bearing member 7 from moving axially along the center axis A1 of the shaft 2, with respect to the reference 8.

Radial vibrations of the shaft 2, generated as the shaft 2 rotates, may generate reciprocating movement the shaft 2, and subsequently the first bearing member 6, in the first direction D1 and/or reciprocating movement of the shaft 2, the first bearing member 6, and subsequently the second bearing member 7, in the second direction D2. Radial vibrations of the shaft 2, in the second direction D2, may generate reciprocating movement of the first bearing member 6, also in the second direction D2, due to the tight space between the shaft 2 and the first bearing member 6. This in turn generates reciprocating movement of the second bearing member 7 in the second direction D2. As shown in FIG. 5, the first bearing member 6 may be movably arranged along the first direction D1 and the second direction D2, and the second bearing member 7 may be fixedly arranged along the first direction D1, i.e. movably arranged only along the second direction D2.

The reciprocating movement of the first bearing member 6 in the first direction D1 and the reciprocating movement of the second bearing member 7 in the second direction D2 may be such that any size radial vibrations may be dampened. However, in one embodiment, the reciprocating movement of the first bearing member 6 in the first direction D1 may have a maximum amplitude of ±25% of the shaft 2 diameter from the center axis A1. The reciprocating movement of the second bearing member 7 in the second direction D2 may also have a maximum amplitude of ±25% of the shaft 2 diameter from the center axis A1.

Figure 6:
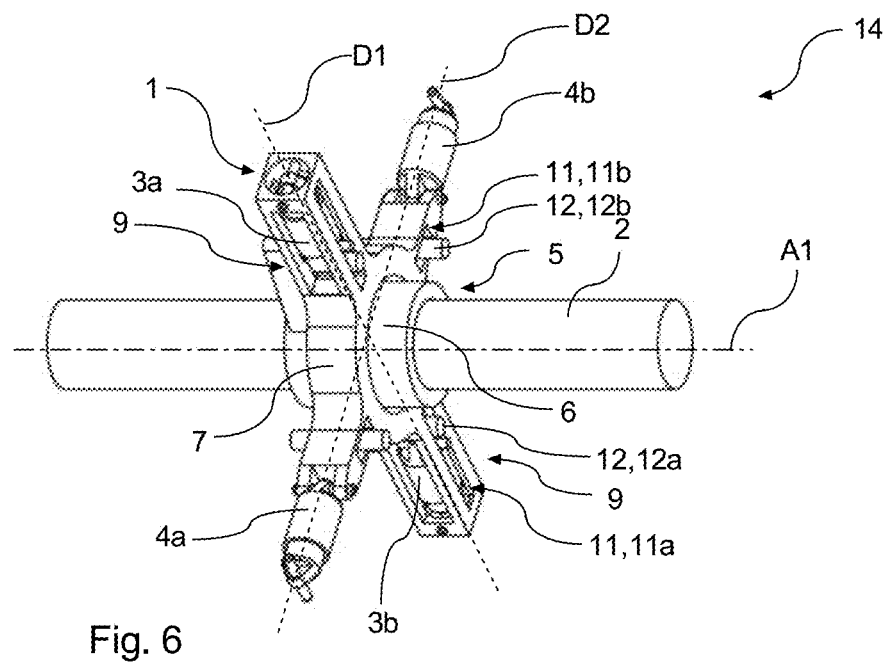
FIG. 6 shows a perspective view of a rotating shaft arrangement in accordance with an embodiment, when arranged on a shaft.
Figure 7:
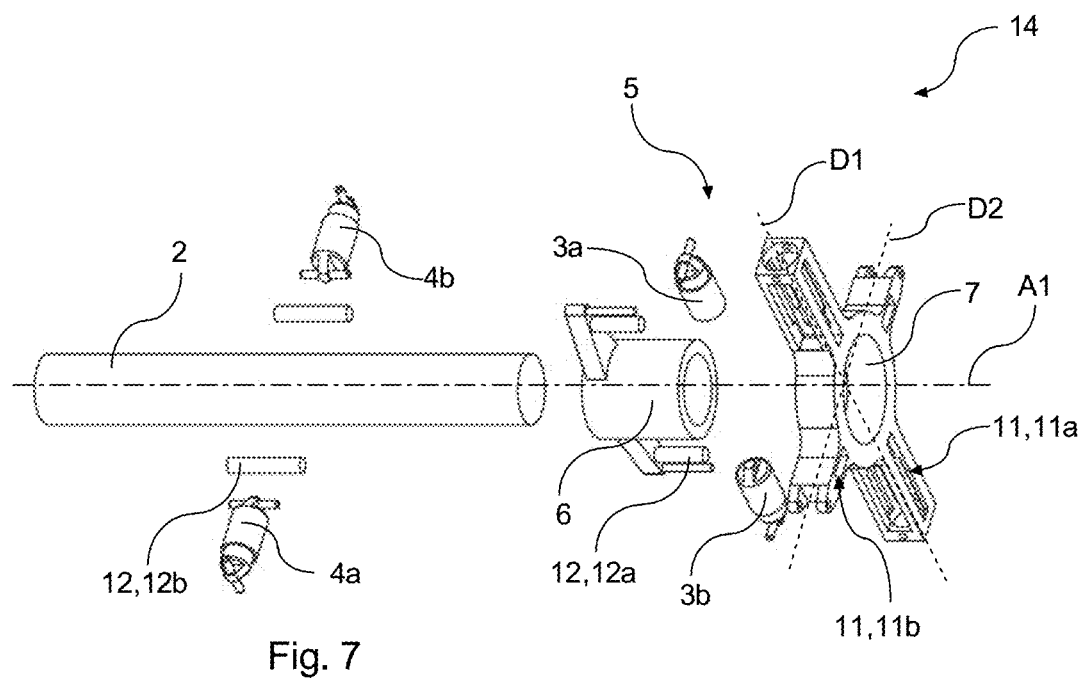
FIG. 7 shows an exploded view of the embodiment of FIG. 6.
Figure 8:
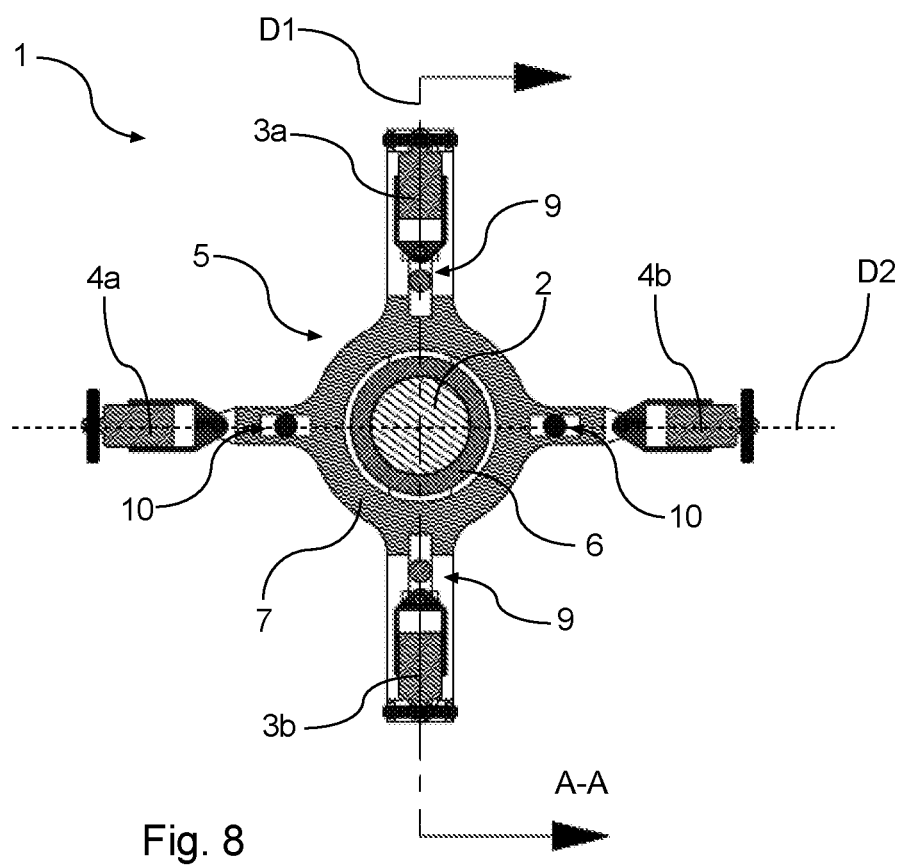
FIG. 8 shows a transverse cross-section of a rotating shaft arrangement in accordance with an embodiment.
Figure 9:
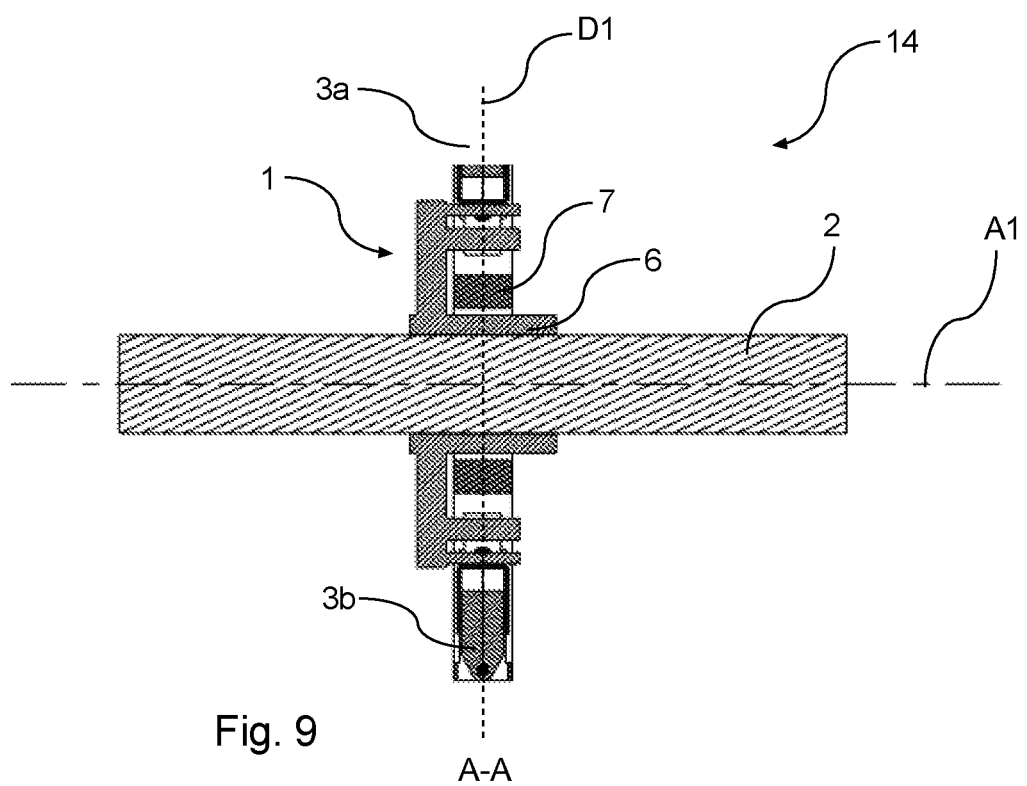
FIG. 9 shows a longitudinal cross-section of the embodiment of FIG. 8.

The first bearing member 6 is operably connected to the second bearing member 7 by the above-mentioned first damping element(s) 3, 3a, 3b and by a first steering structure 9, shown in FIGS. 5 to 7. The first steering structure 9 allows only reciprocating movement of the shaft 2 and the first bearing member 6 in the first radial direction D1. The first damping element 3 dampens this reciprocating movement in the first radial direction D1 with respect to the second bearing member 7.

Correspondingly, the second bearing member 7 is operably connected to the reference 8 by the second damping element(s) 4, 4a, 4b and by a second steering structure 10, also shown in FIGS. 5 to 7. The second steering structure 10 allows mainly reciprocating movement of the second bearing member 7, as well as some movement of the shaft 2 and the first bearing member 6, in the second radial direction D2. The second damping element 4 dampens this reciprocating movement in the second radial direction D2 with respect to the reference 8.

The first steering structure 9 and/or the second steering structure 10 may comprise at least two slidingly engaging steering elements, the steering elements preferably being one groove 11 and one protrusion 12, as shown in FIGS. 5 to 7.

In one embodiment, shown in FIGS. 5 to 7, the second bearing member 7 comprises a plurality of grooves 11, at least one first groove 11a being part of the first steering structure 9, and at least one second groove 11b being part of the second steering structure 10. The first bearing member 6 comprises at least one first protrusion 12a engaging the first groove 11a, and the reference 8 comprises at least one second protrusion 12b engaging the second groove 11b. The embodiments shown in FIGS. 5 to 7 disclose two first grooves 11a, two second grooves 11b, two first protrusions 12a, and two second protrusions 12b. The respective combinations of groove 11 and protrusion 12 are preferably equidistantly distributed around the shaft. In one embodiment, two first grooves 11a and two first protrusions 12a are arranged along the first direction D1, and two second grooves 11b and two second protrusions 12b are arranged along the second direction D2.

As shown in particular in FIGS. 3 to 5, the first damping element 3 may be at least partially located between the first bearing member 6 and the second bearing member 7 to dampen the reciprocating movement of the first bearing member 6 in the first direction D1. The second damping element 4 may, correspondingly, be at least partially located between the second bearing member 7 and the reference 8 to dampen the reciprocating movement of the second bearing member 7 in the second direction D2.

As mentioned above, the first bearing member 6, the second bearing member 7, and the reference 8 are preferably substantially prismatic in shape, e.g. cylindrical, as also shown in FIG. 5.

As mentioned above, the first damping element 3 and the second damping element 4 may be fluids. In such an embodiment, the bearing arrangement 5 is provided with compartments for holding the fluids, while also allowing the fluids to move, within the compartments, in response to the reciprocating movement of the shaft 2.

Such compartments may be formed by means of peripherally extending recesses (not shown). The first bearing member 6 and the second bearing member 7 may comprise one peripherally extending recess each, each recess being configured to accommodate fluid. In one embodiment, the peripherally extending recesses extend in outer circumferential surfaces of the first bearing member 6 and the second bearing member 7. Nevertheless, the recesses may extend at any part of the interface between the first bearing member 6 and the second bearing member 7, and the interface between the second bearing member 7 and the reference 8. For example, the second bearing member 7 may comprise both a peripherally extending recess, extending in and along the outer peripheral surface of the second bearing member 7 and forming an interface together with an inner circumferential surface of the reference 8, and an internally extending recess, extending in the inner circumferential surface of the second bearing member 7 and forming an interface together with the outer circumferential surface of the first bearing member 6. Furthermore, the inner circumferential surface of the reference 8 may comprise an internally extending recess.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The invention claimed is:

1. A damping arrangement (1) for damping radial vibrations in a rotating shaft (2), said damping arrangement (1) comprising:
   at least one first damping element (3),
   at least one second damping element (4), and
   a bearing arrangement (5) operably engaging said first damping element (3) and said second damping element (4),
   said bearing arrangement (5) comprising:
   a first bearing member (6),
   a second bearing member (7), and a reference (8), at least partially arranged in a nesting configuration, said first bearing member (6) being rotatably mounted on said shaft (2) so that radial movement of said shaft (2) is transferred to said first bearing member (6), said first bearing member (6) being operably connected to said second bearing member (7) by said first damping element (3) and by a first steering structure (9), said first steering structure (9) allowing only reciprocating movement of said first bearing member (6), and said shaft (2), in a first radial direction (D1), and said first damping element (3) dampening said reciprocating movement in said first radial direction (D1) with respect to said second bearing member (7), said second bearing member (7) being operably connected to said reference (8) by said second damping element (4) and by a second steering structure (10), said second steering structure (10) allowing only reciprocating movement of said second bearing member (7), said first bearing member (6), and said shaft (2), in a second radial direction D2, and said second damping element (4) dampening said reciprocating movement in said second radial direction (D2) with respect to said reference (8), wherein said first steering structure (9) and/or said second steering structure (10) comprise at least two slidingly engaging steering elements.

2. The damping arrangement (1) according to claim 1, wherein said second direction (D2) is angularly spaced from said first direction (D1), by an angle of at least 45°.

3. The damping arrangement (1) according to claim 1, wherein said second direction (D2) extends perpendicular to said first direction (D1) and to a center axis (A1) of said shaft (2).

4. The damping arrangement (1) according to claim 3, wherein said damping arrangement (1) comprises two first damping elements (3a, 3b) arranged along said first direction (D1), on diametrically opposite sides of said center axis (A1).

5. The damping arrangement (1) according to claim 3, wherein said damping arrangement (1) comprises two second damping elements (4a, 4b) arranged along said second direction (D2), on diametrically opposite sides of said center axis (A1).

6. The damping arrangement (1) according to claim 1, wherein radial vibrations of said shaft (2) generate reciprocating movement of said first bearing member (6) in said first direction (D1) and/or said second direction (D2), and/or reciprocating movement of said second bearing member (7) in said second direction (D2).

7. The damping arrangement (1) according to claim 1, wherein said first damping element (3) is at least partially located between said first bearing member (6) and said second bearing member (7) to dampen reciprocating movement of said first bearing member (6) in said first direction (D1), and said second damping element (4) is at least partially located between said second bearing member (7) and said reference (8) to dampen reciprocating movement of said second bearing member (7) in said second direction (D2).

8. The damping arrangement (1) according to claim 1, wherein said first damping element (3) and second damping element (4) are one of a single-acting and a double-acting damping element.

9. The damping arrangement (1) according to claim 1, wherein said steering elements comprise one groove (11) and one protrusion (12).

10. The damping arrangement (1) according to claim 9, wherein said second bearing member (7) comprises a plurality of grooves (11), a first groove (11a) being part of said first steering structure (9), and a second groove (11b) being part of said second steering structure (10), said first bearing member (6) comprises a first protrusion (12a) engaging said first groove (11a), and said reference (8) comprises a second protrusion (12b) engaging said second groove (11b).

11. The damping arrangement (1) according to claim 1, wherein said reference (8) comprises at least one axial stop (13) configured to prevent said first bearing member (6) and said second bearing member (7) from moving axially along said shaft (2), with respect to said reference (8).

12. The damping arrangement (1) according to claim 1, wherein said second direction (D2) is angularly spaced from said first direction (D1), by an angle of approximately 90°.

13. A damping arrangement (1) for damping radial vibrations in a rotating shaft (2), said damping arrangement (1) comprising:

at least one first damping element (3), at least one second damping element (4), and a bearing arrangement (5) operably engaging said first damping element (3) and said second damping element (4), said bearing arrangement (5) comprising:
a first bearing member (6),
a second bearing member (7), and
a reference (8), at least partially arranged in a nesting configuration, said first bearing member (6) being rotatably mounted on said shaft (2) so that radial movement of said shaft (2) is transferred to said first bearing member (6), said first bearing member (6) being operably connected to said second bearing member (7) by said first damping element (3) and by a first steering structure (9), said first steering structure (9) allowing only reciprocating movement of said first bearing member (6), and said shaft (2), in a first radial direction (D1), and said first damping element (3) dampening said reciprocating movement in said first radial direction (D1) with respect to said second bearing member (7), said second bearing member (7) being operably connected to said reference (8) by said second damping element (4) and by a second steering structure (10), said second steering structure (10) allowing only reciprocating movement of said second bearing member (7), said first bearing member (6), and said shaft (2), in a second radial direction D2, and said second damping element (4) dampening said reciprocating movement in said second radial direction (D2) with respect to said reference (8), said shaft (2), said first bearing (15), said second bearing (16), and said damping arrangement (1) sharing a center axis (A1), said first bearing (15) and said second bearing (16) being separated by a distance (d3) along said center axis (A1), and said damping arrangement(s) (1) being arranged between said first bearing (15) and said second bearing (16) at a location, along said center axis (A1), where the radial vibrations of said shaft (2) have a maximum amplitude.

\* \* \* \* \*